United States Patent
Matsumura et al.

(10) Patent No.: US 7,293,943 B1
(45) Date of Patent: Nov. 13, 2007

(54) TOOL HOLDER

(75) Inventors: Hideyumi Matsumura, Inuyama (JP); Hiroshi Yoshimura, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 11/701,381

(22) Filed: Feb. 2, 2007

(30) Foreign Application Priority Data

Feb. 2, 2006 (JP) .............................. 2006-025287

(51) Int. Cl.
 *B23Q 11/10* (2006.01)
(52) U.S. Cl. ..................... 409/136; 408/60; 409/232
(58) Field of Classification Search ............... 409/136, 409/135, 231–233; 408/56, 57, 59, 60, 61; 184/6.14, 6.26
See application file for complete search history.

(56) References Cited

U.S. PATENT DOCUMENTS

| | | | | |
|---|---|---|---|---|
| 4,921,376 | A * | 5/1990 | Tani et al. | 409/131 |
| 5,050,532 | A * | 9/1991 | Ruppert | 118/663 |
| 5,615,836 | A * | 4/1997 | Graef | 239/428.5 |
| 5,676,506 | A * | 10/1997 | Sugata | 409/136 |
| 6,557,784 | B1 * | 5/2003 | Nakamura et al. | 239/427 |
| 6,672,809 | B2 * | 1/2004 | Senzaki | 409/136 |
| 6,746,185 | B2 * | 6/2004 | Hubbard et al. | 408/1 R |
| 6,808,342 | B2 * | 10/2004 | Kress et al. | 409/136 |
| 6,981,825 | B2 * | 1/2006 | Sugata et al. | 409/136 |
| 2002/0033081 | A1 * | 3/2002 | Hara | 82/1.11 |
| 2002/0119019 | A1 * | 8/2002 | Hara | 409/131 |
| 2004/0079207 | A1 * | 4/2004 | Matsumura et al. | 82/158 |

FOREIGN PATENT DOCUMENTS

| | | | |
|---|---|---|---|
| JP | 6011492 Y2 | | 4/1985 |
| JP | 62123563 Y2 | | 8/1987 |
| JP | 425650 Y2 | | 6/1992 |
| JP | 5107240 A | | 4/1993 |
| JP | 08304346 A | | 11/1996 |
| JP | 10111210 A | | 4/1998 |
| JP | 11030608 A | | 2/1999 |
| JP | 11096981 A | | 4/1999 |
| JP | 200-218466 A | * | 8/2000 |
| JP | 2001-150294 | | 6/2001 |
| JP | 2002320925 A | | 11/2002 |
| JP | 2006-281322 A | * | 10/2006 |

\* cited by examiner

*Primary Examiner*—Erica Cadugan
(74) *Attorney, Agent, or Firm*—Browdy and Neimark, PLLC

(57) ABSTRACT

In a tool holder, when oil supplied via an oil supply passage and an oil introducing passage reaches an atomizing space, the oil is atomized by an air flow of carrier gas consisting of compressed air, and then water supplied from a water supply passage and a water introducing passage is formed into a water drop in the atomizing space by an air flow of oil containing compressed air to generate the water drop with oil film in which the oil film is formed on a surface of the water drop. Since the water drop with oil film is supplied to a work piece through a top nozzle and an in-tool passage, the water drop with oil film is generated at an extremely close location to a tool, and therefore, responsiveness when supplying the water drop with oil film to the work piece can be enhanced.

4 Claims, 8 Drawing Sheets

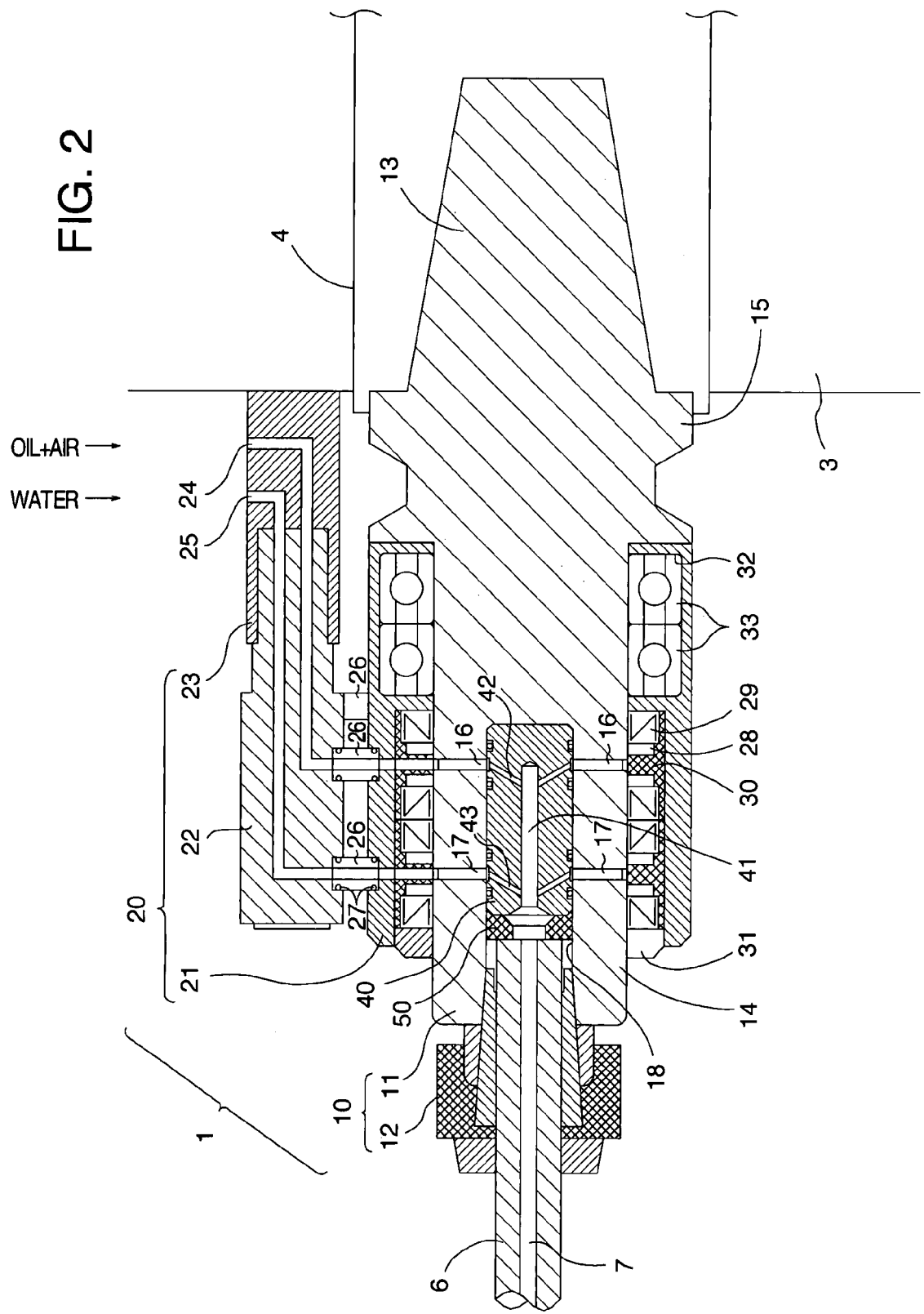

TOOL HOLDER

BACKGROUND OF THE INVENTION

1. Field of the Invention

The present invention relates to a tool holder which is mounted on a spindle of a machine tool to hold a tool for machining a work piece.

2. Description of Related Art

When performing machining such as cutting and grinding for a work piece, lubrication of the work piece and a working tool and cooling of heat generated by the machining are performed by sprinkling a working fluid such as oil and emulsion in a liquid state, or atomizing the liquid to spray it on a surface of the work piece to be machined from a nozzle provided toward a vicinity of a working point, in order to improve machining accuracy and increase a life of the working tool. In the case of atomizing the working fluid to spray it, there is proposed a method of mixing the working fluids of different kinds such as oil and water, and thereafter spraying the working fluids on the machined surface of the work piece, or a method of providing a plurality of nozzles to spray the working fluids of different kinds on the machined surface of the work piece from the respective nozzles.

However, since the working fluid is continuously supplied over a machining time of the work piece in order to obtain sufficient lubrication and cooling effects during the machining, there has been the problem that a large amount of working fluid is required when the working fluid is sprinkled in the liquid state. In particular, since incombustible emulsion requires to be processed as industrial waste when it is deteriorated, there has been the problem that high cost is required in processing a large amount of used or old emulsion. On the other hand, in the case of spraying the working fluid after atomizing it in order to reduce the use amount of the working fluid, there has been the problem that too much oil is scattered in the air when atomizing and spraying the oil due to the small mass of the oil, and therefore a sufficient amount of oil does not attach to the machined surface of the work piece, by which the lubrication of the work piece and the working tool and the cooling of the heat are not sufficiently performed. In addition, there has also been the problem that it is conceivable that the scattering of the atomized oil causes the risk of fire, influences human bodies and the like, in the respect of factory environment. Further, in the method of spraying the mixture solution of water and oil, or spraying those on the worked surface from the separate nozzles as described above, too much oil is also scattered in the air, and therefore, there has been the same problem.

Accordingly, in order to solve the above described problems, there has been proposed, in recent years, a method of generating a water drop with oil film by forming water supplied from an outside into a water drop and forming the oil film on a surface of the water drop as a working fluid, and machining the work piece while spraying this working fluid on the work piece (for example, see JP-A-2001-150294).

BRIEF SUMMARY OF THE INVENTION

However, in the case of the method of generating the water drop with oil film as a working fluid and then supplying the working fluid to the work piece as described above, since a device for generating the water drop with oil film has conventionally been equipped at the outside of the tool holder, there are problems that responsiveness is slow when the water drop with oil film is supplied to the work piece, and the discharge amount of the water drop with oil film to the work piece is insufficient. Namely, since the water drop with oil film is generated at a position away from the tool holder, the time after a valve for supplying required air for generation of the water drop with oil film is opened to feed the air until the generated water drop with oil film is supplied to the work piece via the tool holder and the tool is long, and further, loss occurs in the process until the generated water drop with oil film is supplied to the work piece, which makes it impossible to supply a sufficient amount of the water drop with oil film to the work piece.

The present invention is made in view of the above described circumferences, and an object of the present invention is to provide a tool holder having high responsiveness when supplying a generated water drop with oil film to a work piece, and capable of supplying a sufficient amount of the water drop with oil film to the work piece.

In order to attain the above-described object, in the invention, in a tool holder which is mounted on a machine tool and holds a tool for machining a work piece, the tool holder is composed of a tool mounting part which is connected to a spindle of the machine tool, on which part the tool is mounted, and a support part which is fixed to a body side of the machine tool and supports the tool mounting part in a rotatable manner via a bearing, characterized in that the tool mounting part contains in its inside a mist generating nozzle which is formed into a cylindrical shape in which an atomizing space is formed in its center so as to open forward, and an oil introducing passage communicating with a rear side portion of the atomizing space and a water introducing passage communicating with a front side portion of the atomizing space are formed, and a top nozzle which is disposed in a front side portion of the mist generating nozzle and abuts on a rear end portion of the tool to communicate with an in-tool passage formed inside the tool, an oil supply passage for supplying oil to the oil introducing passage by carrier gas consisting of compressed air, and a water supply passage for supplying water to the water introducing passage are formed in the support part, and when the oil supplied via the oil supply passage and the oil introducing passage reaches the atomizing space, the oil is atomized by an air flow of the carrier gas consisting of the compressed air, the water supplied from the water supply passage and the water introducing passage is formed into a water drop in the atomizing space by an air flow of oil containing compressed air containing the atomized oil to generate a water drop with oil film in which the oil film is formed on a surface of the water drop, and the water drop with oil film is supplied to the work piece through the top nozzle and the in-tool passage.

Further, in the invention, the tool holder is characterized in that incident angles of the oil introducing passage and the water introducing passage with respect to the atomizing space in the mist generating nozzle are formed to be an acute angle.

Further, in the invention, the tool holder is characterized in that the atomizing space in the mist generating nozzle is formed to pass through up to a rear end surface of the mist generating nozzle, an air introducing passage is formed in the tool mounting part to communicates with the atomizing space passing through up to the rear end surface, and the atomization of the oil and the generation of the water drop with oil film in the atomizing space are promoted by supplying compressed air to the air introducing passage from the outside.

In the tool holder in the invention, when the oil supplied via the oil supply passage and the oil introducing passage reaches the atomizing space, the oil is atomized by the air flow of the carrier gas consisting of the compressed air, and then the water supplied from the water supply passage and the water introducing passage is formed into the water drop in the atomizing space by the air flow of the oil containing compressed air containing the atomized oil to generate the water drop with oil film in which the oil film is formed on the surface of the water drop, and the water drop with oil film is supplied to the work piece through the top nozzle and the in-tool passage. Therefore, since a position in which the water drop with oil film is generated is formed at a position extremely close to the tool, the responsiveness when supplying the water drop with oil film to the work piece can be enhanced. That is, since the process before the generated water drop with oil film is supplied to the work piece is short, the response time before the water drop with oil film attached is supplied to the work piece through the in-tool passage after the valve which supplies necessary compressed air for generation of the water drop with oil film is opened, and the oil containing the compressed air is fed out to generate the water drop with oil film can be made short.

In the invention, since the incident angles of the oil introducing passage and the water introducing passage with respect to the atomizing space in the mist generating nozzle are formed to be an acute angle, the oil and water can be smoothly supplied into the mist generating nozzle rotating at a high speed.

In the invention, the atomizing space in the mist generating nozzle is formed to pass through up to the rear end surface, the air introducing passage which passes through up to the rear end surface and communicates with the atomizing space is formed in the tool mounting part, the compressed air is supplied to the air introducing passage from the outside and the atomization of the oil and the generation of the water drop with oil film in the atomizing space are promoted, thereby making it possible to be applied to a tool holder adopting a supply system having three systems of water, oil and compressed air, and compressed air.

BRIEF DESCRIPTION OF THE SEVERAL VIEWS OF THE DRAWINGS

FIG. 2 is a sectional view showing the inside of the tool holder according to the embodiment;

DETAILED DESCRIPTION OF THE INVENTION

Figure 1:
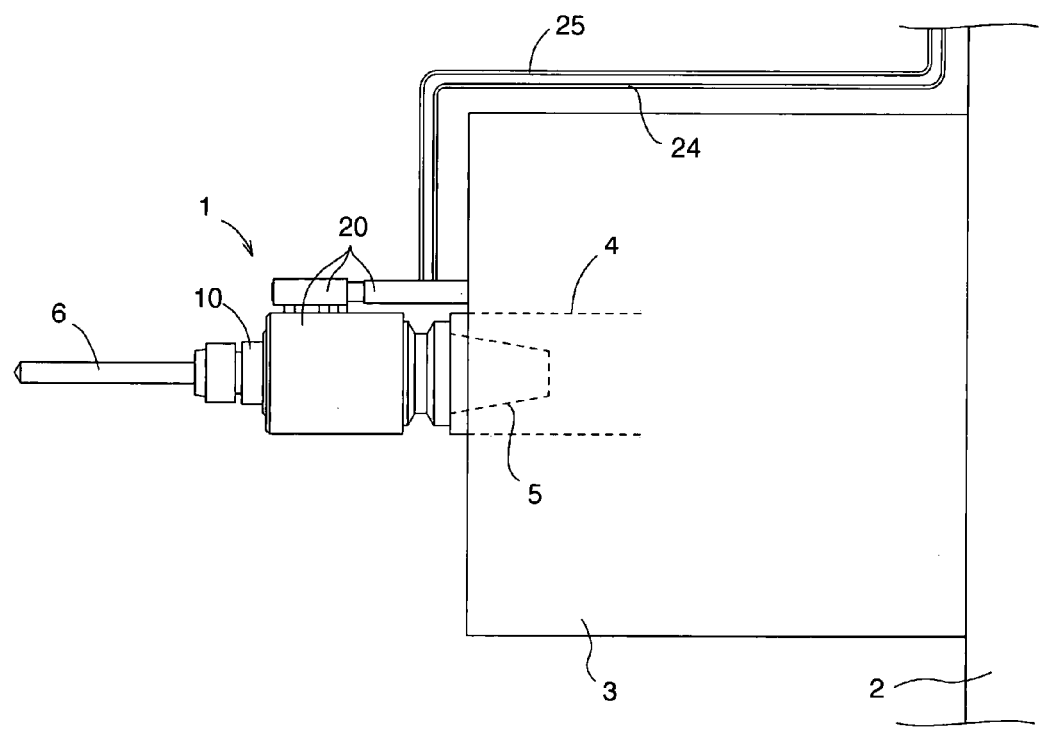
FIG. 1 is a side view of a spindle part of a machine tool on which a tool holder according to an embodiment is mounted.

Hereinafter, an embodiment of the present invention will be described with reference to the drawings. First, the outline of a machine tool 2 on which a tool holder 1 according to the embodiment is mounted will be described with reference to FIG. 1. FIG. 1 is a side view of a spindle part 3 of the machine tool 2, on which the tool holder 1 according to the embodiment is mounted.

As shown in FIG. 1, the machine tool 2 such as a machining center generally has the spindle part 3 of a cylindrical shape to which the tool holder 1 holding a tool 6 for working a work piece is fitted. A spindle 4 which is rotationally driven by a drive source of the machine tool 2 is located in a substantially center of the spindle part 3, and the tool holder 1 is fitted to a tip end of the spindle 4, whereby the tool 6 rotates to work the work piece.

The tool holder 1 according to the embodiment is composed of a tool mounting part 10 to which the tool 6 is fitted, and a support part 20 which supports the tool mounting part 10 in a rotatable manner, as described below in detail. The tool mounting part 10 is connected to the above described spindle 4, and the support part 20 is fixed to a front surface of the spindle part 3 which is fixed to the body side of the machine tool 2. When the tool mounting part 10 is connected to the spindle 4, the connection is achieved by fitting a fitting projected portion 13 which will be described later of the tool mounting part 10 into a fitting recessed portion 5 of the spindle 4.

Figure 6:
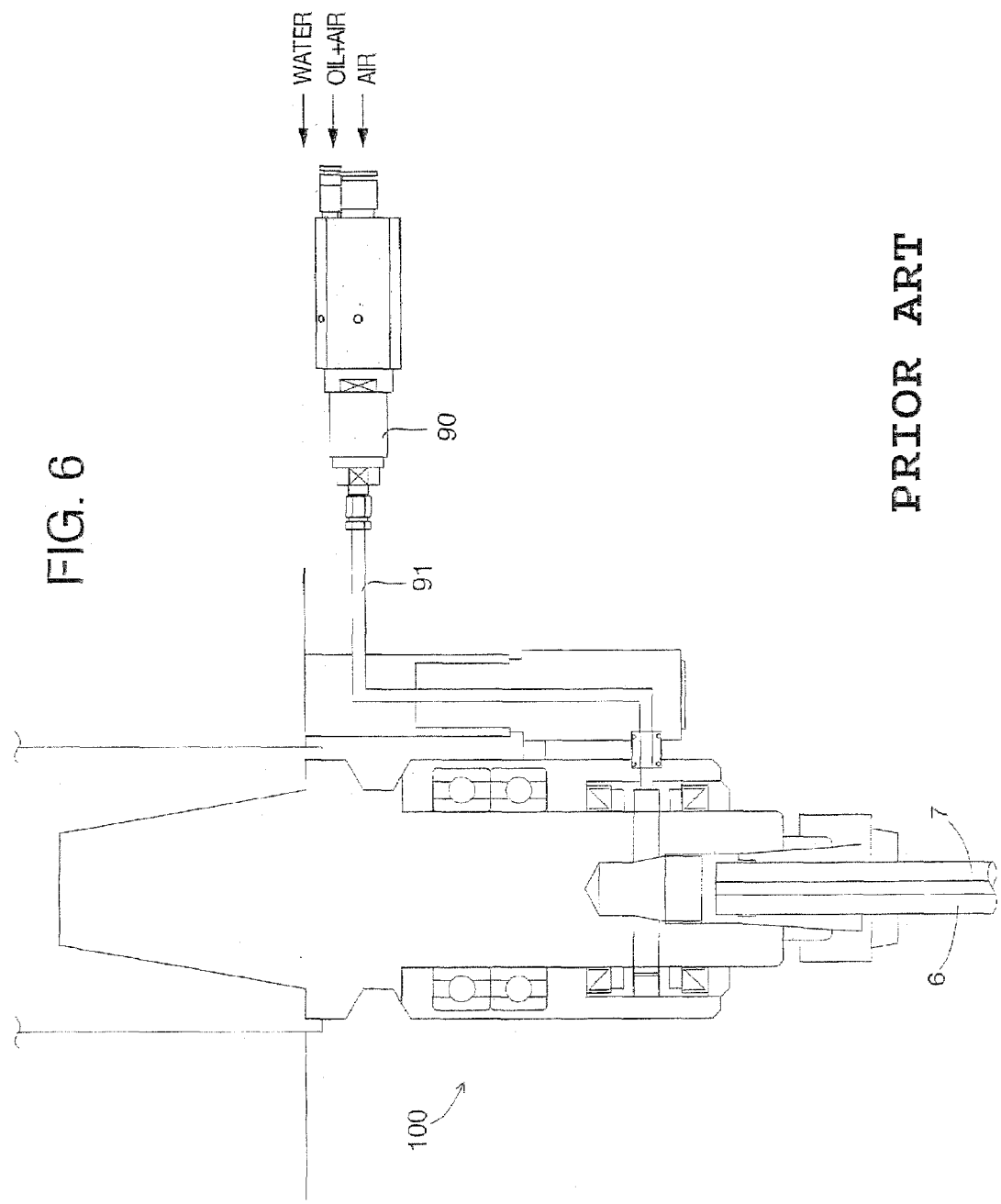
FIG. 6 is a schematic view showing the structure of a conventional tool holder.

A passage member 22 (see FIG. 2) which will be described later for supplying oil and compressed air, and water to the tool holder 1 is mounted to the support part 20, and when the tool holder 1 is fitted to the machine tool 2 as shown in FIG. 2, a rear end of the passage member 22 is fitted in and connected to a fixing member 23 fixed to the spindle part 3. Thereby, the oil and water are supplied to the tool holder 1 through an oil supply passage 24 and a water supply passage 25 from a supply system which will be described later (see FIG. 6).

Figure 3A:
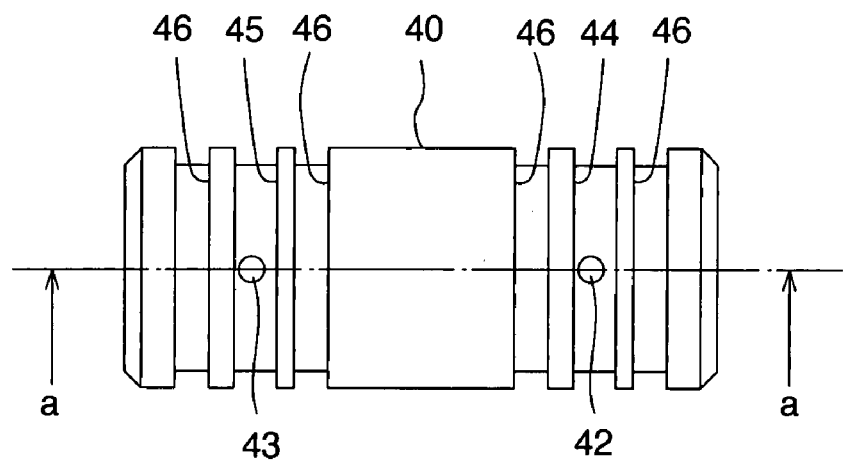
FIGS. 3A and 3B are a front view (FIG. 3A) and a sectional view (FIG. 3B) of a mist generating nozzle.
Figure 3B:
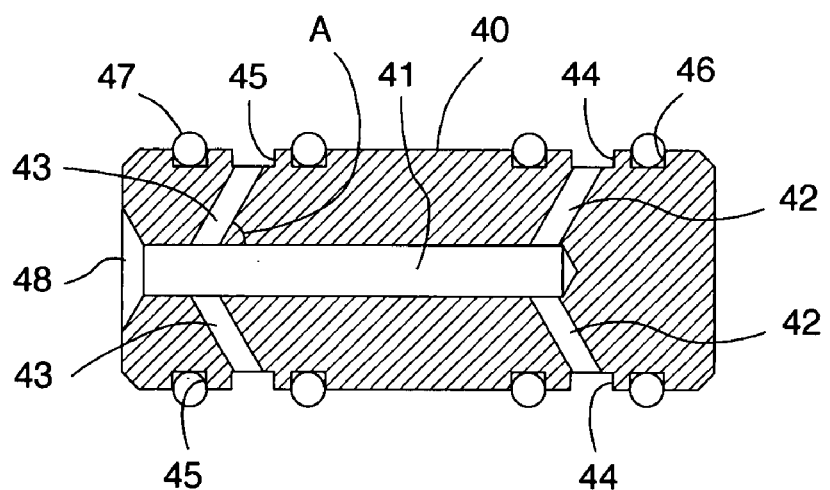

The outline of the machine tool 2 to which the tool holder 1 according to the embodiment is fitted is described above. Next, the construction of the tool holder 1 according to the embodiment will be described with reference to FIG. 2, and FIGS. 3A and 3B. FIG. 2 is a sectional view showing the inside of the tool holder 1 according to the embodiment, and FIGS. 3A and 3B are a front view (FIG. 3A) and a sectional view (FIG. 3B) of a mist generating nozzle 40 incorporated in the tool holder 1.

In FIG. 2, the tool holder 1 is composed of the tool mounting part 10 connected to the spindle 4 of the machine tool 2, and the support part 20 which is fixed to the body side of the machine tool 2 to support the tool mounting part 10 in a rotatable manner, as described above. Further, in the tool mounting part 10, the mist generating nozzle 40 which constitutes a main part of the present invention is built in, as will be described later.

First, the tool mounting part 10 is composed of a rotary member 11 in which the mist generating nozzle 40 is incorporated, and a chuck member 12 for fixing the tool 6 to the tool mounting part 10. The rotary member 11 is formed from a metal material. At a side thereof where the tool 6 is fitted (hereinafter, called a tip end side), the mist generating nozzle 40 is incorporated in its inside, and its outer periphery is formed into a cylindrical shape as a built-in portion 14 which is a portion supported by the support part 20. Further, a side of the rotary member 11 on which the machine tool 2 is located (hereinafter, called the rear end side) is formed into a truncated cone shape as a fitting projected portion 13 which is fitted into the fitting recessed portion 5 of the spindle 4 which is described above. Furthermore, a portion between the fitting projected portion 13 and the built-in portion 14 is formed as a flange portion 15, and the support part 20 (more accurately, a rear end surface of a support cylinder member 21 which will be described later of the support part 20) abuts on a tip end side of the flange portion 15 while a front end surface of the spindle 4 abuts on a rear end side of the flange portion 15.

In the built-in portion 14 of the rotary member 11, a nozzle fitting recessed portion 18 is formed in its center so as to open forward, and the mist generating nozzle 40 and a top nozzle 50 are inserted into the nozzle fitting recessed portion 18. In the built-in portion 14, a plurality of oil connection passages 16 and water connection passages 17 (in the case of this embodiment, four for each) penetrating through the nozzle fitting recessed portion 18 and the outer peripheral surface of the built-in portion 14 are provided by boring. The oil connection passage 16 is formed on a rear side of the nozzle fitting recessed portion 18, and the water connection passage 17 is formed on a front side of the nozzle fitting recessed portion 18. On the outer peripheries of the oil connection passages 16 and the water connection passages 17, grooves are provided circumferentially so that upper end openings of the plurality of oil connection passages 16 and water connection passages 17 communicate with each other.

The mist generating nozzle 40 generates a water drop provided with an oil film 110 (see FIG. 7) by oil containing compressed air which contains oil atomized in an atomizing space 41 by supplying oil and compressed air via the oil supply passage 24 which will be described later, and water supplied through the water supply passage 25 which will be described later, and the top nozzle 50 discharges the water drop with oil film 110 generated by the mist generating nozzle 40. The mist generating nozzle 40 will be described later in detail.

The chuck member 12 which constitutes the tool mounting part 10 is located in the tip end portion of the tool mounting part 10, and by inserting the tool 6 into an insertion portion formed in the center of the tool mounting part 10, and rotating it in the clockwise direction seen from the tip end side, the tool 6 is fastened and fixed to the tool mounting part 10. When the tool 6 is fixed to the tool mounting part 10 in this manner, the above described top nozzle 50 abuts on the rear end portion of the tool 6 as shown in FIG. 2. In the tool 6, an in-tool passage 7 for supplying the water drop with oil film 110 to the work piece is formed to pass through it on its axis of rotation.

The support part 20 which pivotally and rotatably supports the above described tool mounting part 10 is composed of the support cylinder member 21 which is formed into a substantially cylindrical shape so as to be provided on the outer periphery of the built-in portion 14 of the rotary member 11, the passage member 22 which is connected to one side of the support cylinder member 21 via a connecting member 26, and the fixing member 23 which is fitted on the rear end of the passage member 22 and fixed to the spindle part 3 of the above described machine tool 2. In the fixing member 23, the connecting member 26, the passage member 22 and the support cylinder member 21, the oil supply passage 24 and the water supply passage 25 which respectively communicate with the oil connection passages 16 and the water connection passages 17 of the above described rotary member 11 are formed. O-rings 27 are provided on the outer peripheries of the upper and lower ends of the connecting member 26 which connects the support cylinder member 21 and the passage member 22, to prevent oil and water from leaking from connecting portions of the support cylinder member 21 and the respective supply passages 24 and 25 of the connecting member 26, and connecting portions of the connecting member 26 and the respective supply passages 24 and 25 of the passage member 22.

A bearing fitting recessed portion 32 of a recessed shape is formed on an inner peripheral surface of a rear end side of the above described support cylinder member 21, and a seal fitting recessed portion 28 of a recessed shape is formed on a front side of the bearing fitting recessed portion 32. Two bearings 33 are fitted in the bearing fitting recessed portion 32 parallel in the axial direction. In the bearing 33, its outer ring is fitted in the bearing fitting recessed portion 32 side, and the rotary member 11 of the tool mounting part 10 is fitted into its inner ring. Therefore, the tool mounting part 10 is supported so as to be able to rotate at the support part 20 including the support cylinder member 21.

Four seals 29 are fitted to the seal fitting recessed portion 28 in parallel in the axial direction via a seal mounting member 30. The seal 29 is provided for preventing oil or water supplied to the mist generating nozzle 40 from leaking outside between the rotary member 11 of the tool mounting part 10 and the support cylinder member 21 of the support part 20. The seal 29 is mounted in the seal fitting recessed portion 28 by the seal mounting member 30, and thereafter, the seal sealing and fixing member 31 is threadedly fitted from the tip end side of the seal fitting recessed portion 28, whereby the seal 29 is fixed to the support cylinder member 21. In the seal mounting member 30, the tip end portions of the oil supply passage 24 and the water supply passage 25 with which the above described oil connection passage 16 and the water connection passage 17 communicate are formed.

Next, the construction of the mist generating nozzle 40 which is incorporated in the rotary member 11 of the tool holder 1 will be described with reference to FIGS. 3A and 3B. In FIGS. 3A and 3B, the mist generating nozzle 40 is formed into a cylindrical shape from stainless steel or the like, the atomizing space 41 which is opened by forming a release port 48 at a front side in its center is formed, and an oil introducing passage 42 communicating with a rear portion of the atomizing space 41, and a water introducing passage 43 communicating with a front portion of the atomizing space 41 are formed. They are formed so that an incident angle A of the oil introducing passage 42 and the water introducing passage 43 with respect to the atomizing space 41 in the mist generating nozzle 40 becomes an acute angle. In the case of the illustrated embodiment, while the incident angle A is 60° (A=60°), the angle may be formed in consideration of the diameter or the like of the mist generating nozzle 40, and is preferably designed to be less than 70°. By forming the incident angle A of the oil introducing passage 42 and the water introducing passage 43 with respect to the atomizing space 41 to be an acute angle, oil and water can be smoothly supplied to the atomizing space 41 of the mist generating nozzle 40 which rotates at a high speed.

When oil and compressed air are fed to the atomizing space 41 from the oil introducing passage 42, oil is atomized by air flow of a carrier gas composed of compressed air when reaching the atomizing space 41, and water supplied from the water introducing passage 43 is formed into water drops at a downstream side of the atomizing space 41 by an air flow of the oil containing compressed air containing the atomized oil to generate a water drop with oil film 110 in which the oil film 111 is formed on a surface of the water drop 112. The water drop with oil film 110 is supplied from a release port 48 through the top nozzle 50 and the in-tool passage 7 to the work piece.

On the outer periphery near the rear side of the mist generating nozzle 40, an oil reservoir groove 44 where the oil, which is supplied from the oil connection passage 16 formed in the rotary member 11, stays is formed along the entire periphery of the mist generating nozzle 40. A plurality (four in the case of the embodiment shown in the drawing) of the above described oil introducing passages 42 are formed in the bottom surface of the oil reservoir groove 44 in a penetrate manner in the diameter direction. Since the oil reservoir groove 44 is formed in this manner, the oil supplied from the oil connection passage 16 can be caused to flow into the oil introducing passage 42 through the oil reservoir groove 44. Thereby, when the mist generating nozzle 40 is incorporated into the tool mounting part 10, the oil introducing passage 42 does not have to be incorporated therein corresponding to the position of the oil connection passage 16, and therefore, the assembling operation can be simplified.

Similarly, on the outer periphery near the front side of the mist generating nozzle 40, a water reservoir groove 45 where the water, which is supplied from the water connection passage 17 formed in the rotary member, stays is formed along the entire periphery of the mist generating nozzle 40. A plurality of (four in the case of the embodiment shown in the drawing) the above described water introducing passage 43 are formed in the bottom surface of the water reservoir groove 45 in a penetrate manner in the diameter direction. Since the water reservoir groove 45 is formed in this manner, the water supplied from the water connection passage 17 can be caused to flow into the water introducing passage 43 through the water reservoir groove 45. Thereby, when the mist generating nozzle 40 is incorporated into the tool mounting part 10, the water introducing passage 43 does not have to be incorporated therein corresponding to the position of the water connection passage 17, and therefore, the assembling operation can be simplified.

Further, O-ring grooves 46 for mounting O-rings 47 for preventing oil from leaking out are formed on both sides of the oil reservoir groove 44 of the mist generating nozzle 40, and O-ring grooves 46 for mounting O-rings 47 for preventing water from leaking out are formed on both sides of the water reservoir groove 45. As compared with the structure in which the spray nozzle is provided inside as in the water drop with oil film generating and mixing device disclosed in JP-A-2001-150294, the mist generating nozzle 40 according to this embodiment can easily atomize oil and water to generate the water drop with oil film with the simple structure in which the atomizing space 41 and the introducing passages 42 and 43 are only provided in the cylindrical cylinder member.

Figure 4:
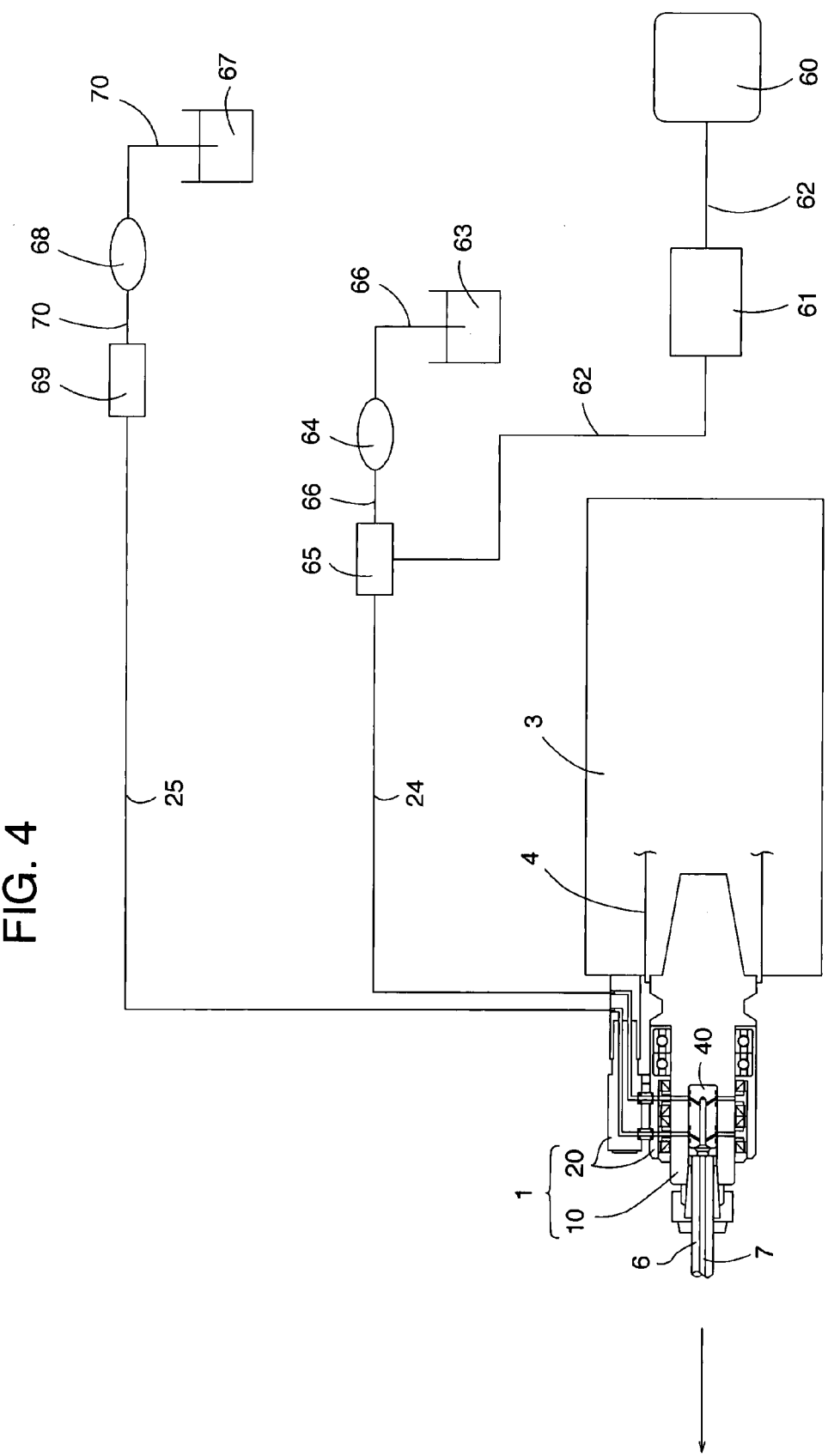
FIG. 4 is a schematic diagram of a supply system according to the embodiment.

The mist generating nozzle 40 according to the embodiment is described above, and a supply system which supplies oil and compressed air, and water to the mist generating nozzle 40 will be described with reference to FIG. 4. FIG. 4 is a schematic diagram of the supply system according to the embodiment.

In the supply system in FIG. 4, a mixing valve 65 which mixes oil and air is connected to the oil supply passage 24 of the tool holder 1. The mixing valve 65 is connected to an oil pump 64 for supplying oil through an oil supply duct 66, and is connected from the oil pump 64 to an oil tank 63 via an oil supply duct 66. An air supply duct 62 is also connected to the mixing valve 65, and the air supply duct 62 is connected to an air pressure regulating mechanism 61 for regulating the pressure of air. The air pressure regulating mechanism 61 is connected to a compressor 60 for supplying air through the air supply duct 62.

A water filter 69 for filtering water is connected to the water supply passage 25 of the tool holder 1. The water filter 69 is connected to a water pump 68 for supplying water through a water supply duct 70, and is connected from the water pump 68 to a water tank 67 where water is stored, via a water supply duct 70.

Next, the process of generating the water drop with oil film 110 in the mist generating nozzle 40 of the tool holder 1 by oil and compressed air, and water, which are supplied to the tool holder 1, will be described with reference to FIGS. 2 to 4 and FIG. 7.

First, the compressed air supplied from the compressor 60 is regulated by the air pressure regulating mechanism 61 so as to have a predetermined pressure (which is any pressure in the range of 0.2 MPa to 0.8 MPa) and is fed into the mixing valve 65. Oil is supplied to the mixing valve 65 from the oil tank 63 by the oil pump 64, and the oil and compressed air which are the oil and air mixed by the mixing valve 65 flow into the oil introducing passage 42 of the mist generating nozzle 40 from the oil connection passage 16 through the oil supply passage 24. When reaching the atomizing space 41 from the oil introducing passage 42 of the mist generating nozzle 40, the oil is atomized in the atomizing space 41 by the air flow of carrier gas composed of the compressed air, and an air flow of the oil containing compressed air containing the atomized oil is sprayed to the downstream side of the atomizing space 41.

Meanwhile, the water supplied from the water tank 67 by the water pump 68 flows into the water introducing passage 43 of the mist generating nozzle 40 from the water connection passage 17 through the water supply passage 25. When it reaches the atomizing space 41 from the water introducing passage 43 of the mist generating nozzle 40, the water which is supplied from the water introducing passage 43 by the air flow of the oil containing compressed air which flows from the upstream side of the atomizing space 41 is formed into water drops on the downstream side of the atomizing space 41 to generate the water drop with oil film 110 in which the oil film 111 is formed on the surface of the water drop 112. The water drops with oil film 110 generated in this manner pass through the top nozzle 50 and are supplied to the work piece 113 through the in-tool passage 7 of the tool 6. The size of the water drop with oil film 110 generated in the mist generating nozzle 40 according to this embodiment is 100 μm to 200 μm.

Figure 7:
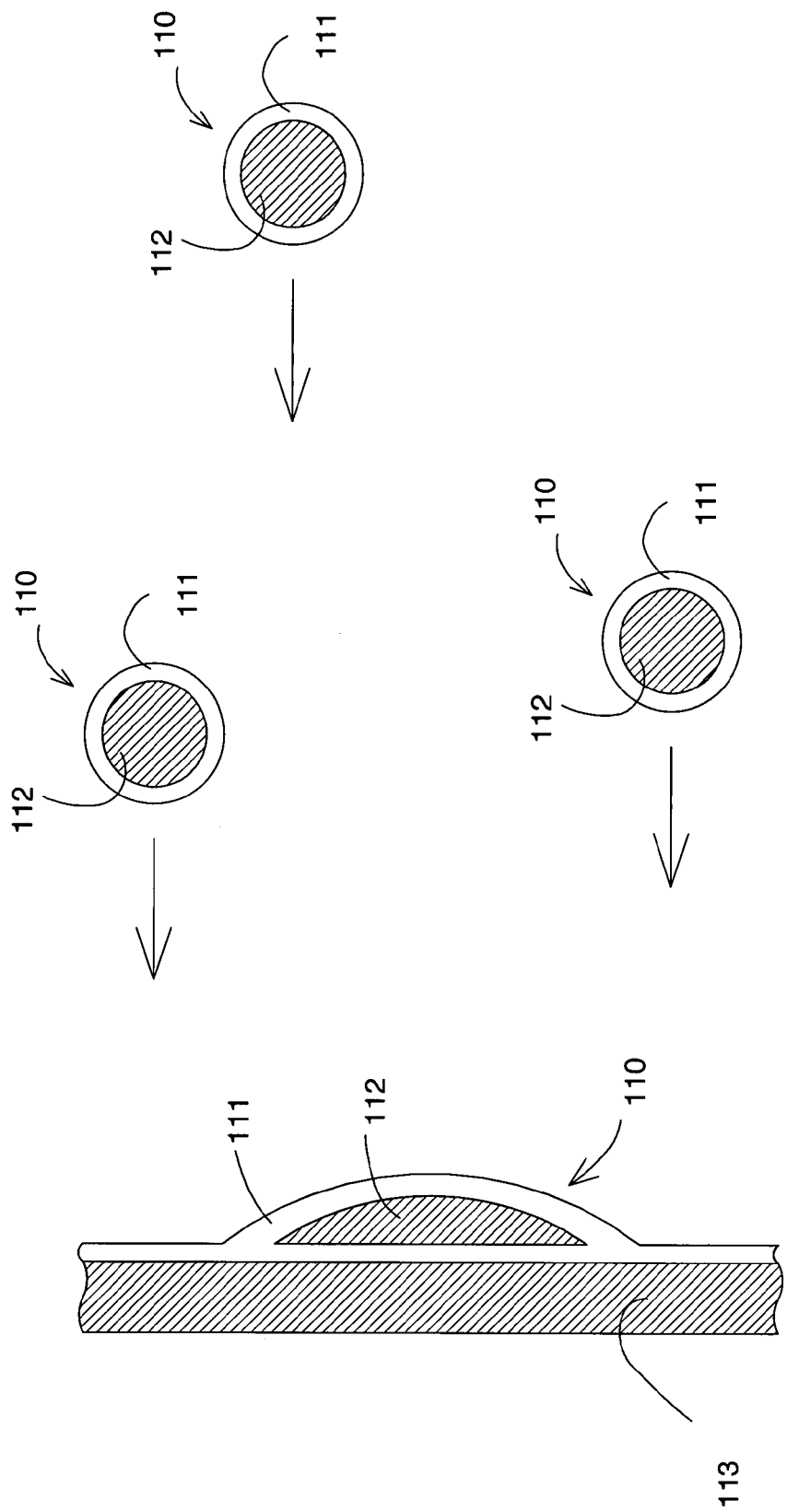
FIG. 7 is a conceptual view of water drops with oil films and a surface of a work piece to which the water drops with oil films is attached.

In this embodiment, machine work is performed while supplying the water drops with oil film 110 generated by the mist generating nozzle 40 as described above to the worked surface of the work piece 113, however, when the water drop with oil film 110 is supplied to the worked surface of the work piece 113, the oil film 111 is generated on the surface of the work piece 113 as shown in FIG. 7, and the water drop with oil film 110 attaches onto the oil film 111. FIG. 7 is a schematic view of the oil film 111 and the surface of the work piece 113 to which the water drop with oil film 110 attaches.

Figure 5:
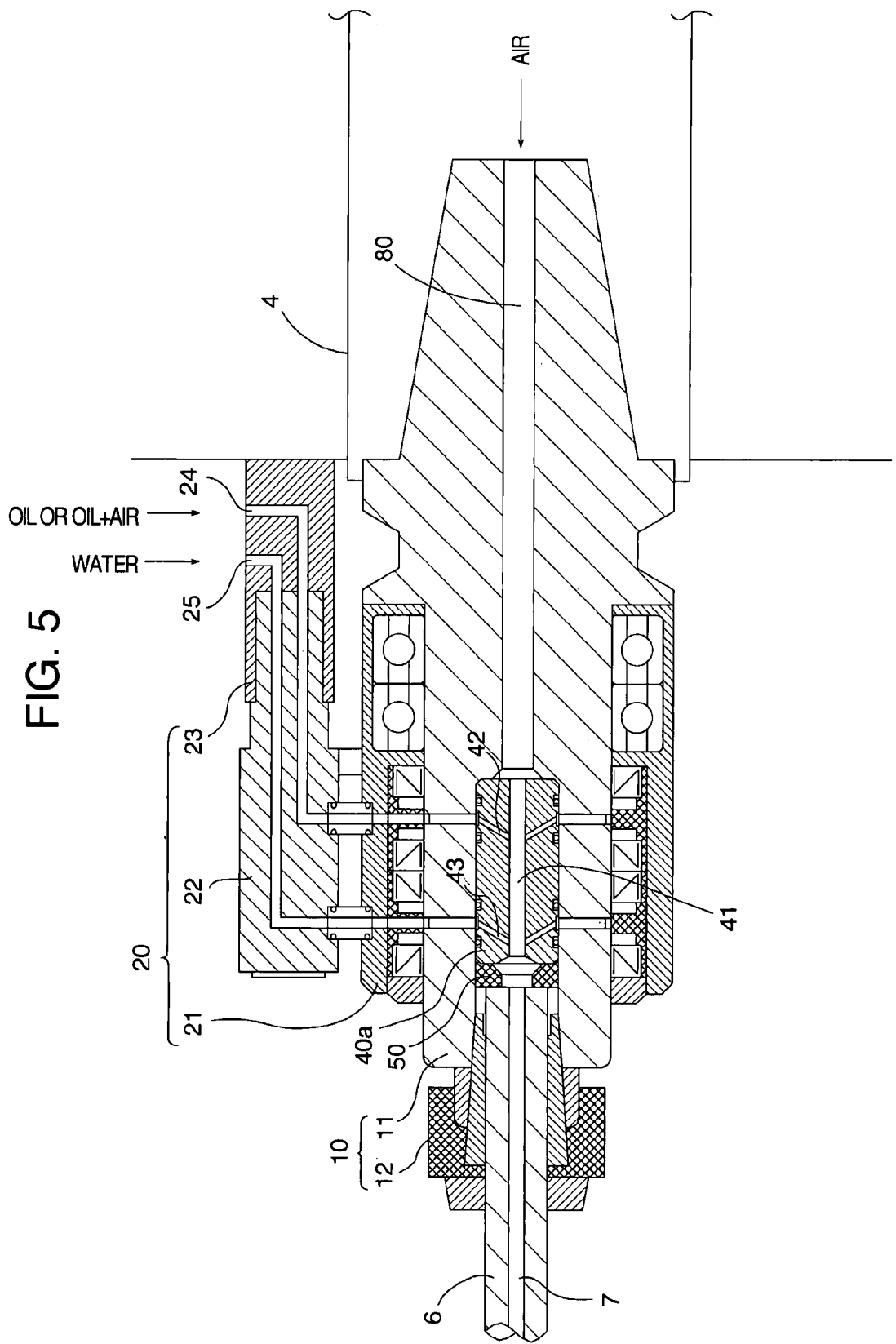
FIG. 5 is a sectional view showing the inside of a tool holder according to another embodiment.

The mist generating nozzle 40 described above has two systems of supply routes which supply oil and compressed air through the oil supply passage 24, and supply water through the water supply passage 25, but as shown in FIG. 5, a mist generating nozzle 40a having three systems of supply routes in which a route for supplying compressed air is added to the above described two routes may be adopted.

In this case, the rear side of the atomizing space 41 of the mist generating nozzle 40a is formed to be penetrated, and an air introducing passage 80 is formed in the center of the rotary member 11 to communicate with the penetrated atomizing space 41, and the air supply duct 62 shown in FIG. 4 is connected to the air introducing passage 80. The relation between the air pressure supplied to the air introducing passage 80 from the air regulating mechanism 61, and the air pressure supplied to the mixing valve 65 from the air regulating mechanism 61 is regulated so that the air pressure of the former becomes high, and the pressure difference of both of them is set at a predetermined pressure or less (which is 0.05 MPa or less according to the experiment), whereby the water drop with oil film 110 is formed in the mist generating nozzle 40a and smoothly supplied to the in-tool passage 7 of the tool 6.

The construction of the tool holder 1 according to the embodiment and the process of generating the water drop with oil film 110 are described above. Next, the measuring tests of the response time when the water drop with oil film 110 is generated, and the discharge amount of the water drop with oil film 110, which are performed for the tool holder 1 according to this embodiment and the conventional tool holder 100 (shown in FIG. 6), will be described. The conventional tool holder 100 includes the mist generating device 90 which generates water drops with oil film outside the tool holder 100, and supplies the water drops with oil film generated in the mist generating device 90 to the tool holder 100 through the mist supply passage 91 to spray them from the in-tool passage 7 of the tool 6.

Figure 8:
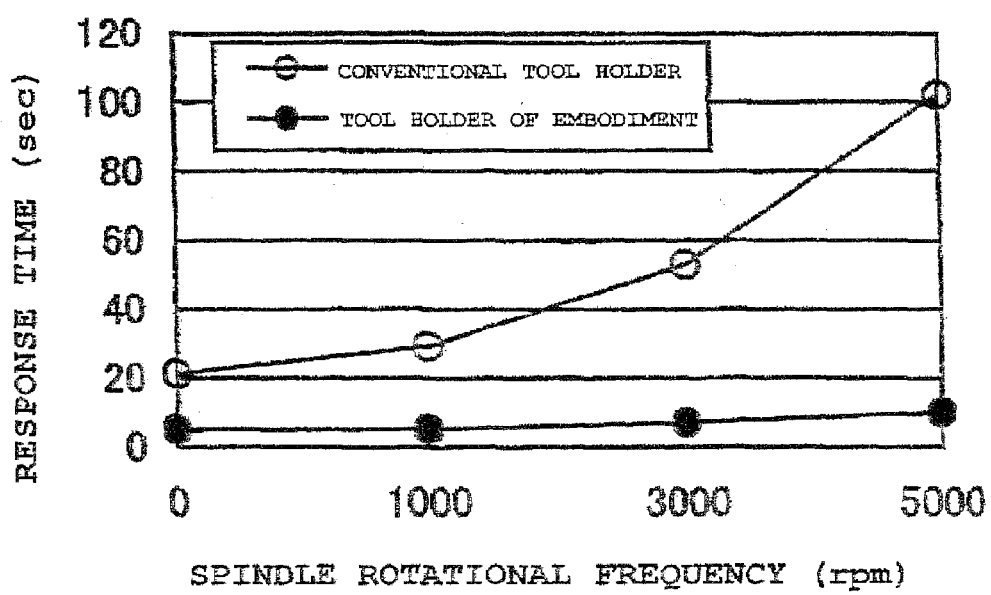
FIGS. 8 and 9 are graphs showing the results of the relationship between rotational frequency and response time, and rotational frequency and discharge amount, respectively, according to an embodiment of the present invention.
Figure 9:
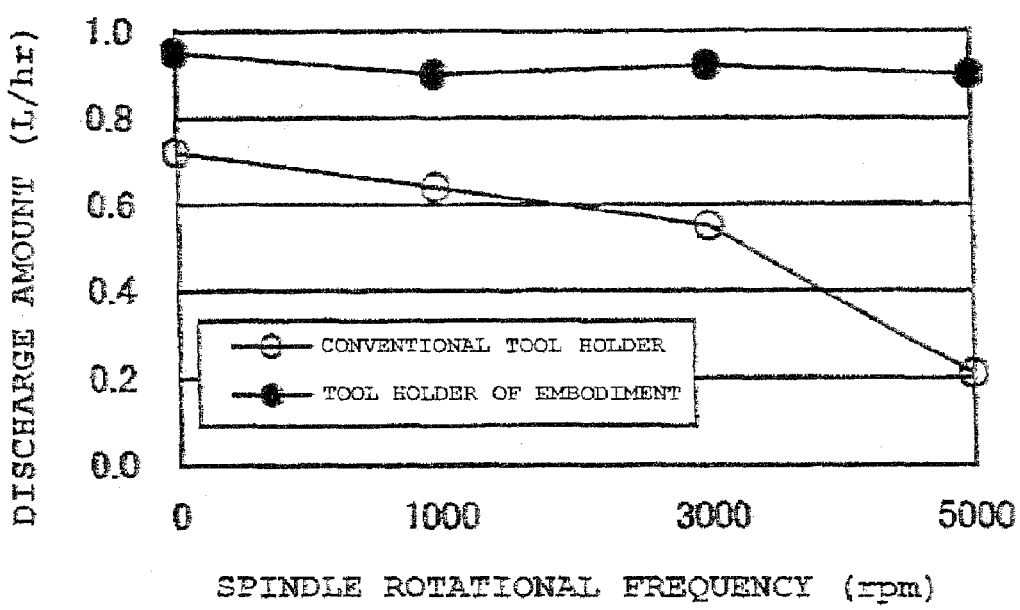

Paying attention to the points that, when supplying the water drop with oil film 110 to the work piece 113, if the air pressure of the compressed air supplied from the compressor 60 is set at a predetermined pressure, the time (response time) after the water drops with oil film 110 are generated until a specified amount of the water drops with oil film 110 are supplied to the work piece 113 after turning on a power source according to the rotational frequency of the tool holder 1, and that the discharge amount of the water drops with oil film 110 to the work piece 113 differ, the relationships between the rotational frequency and the response time, and the rotational frequency and the discharge amount are measured with respect to the tool holder 1 according to this embodiment and the conventional tool holder 100. The results are shown in FIG. 8 and FIG. 9, respectively. The discharge amount of FIG. 9 is the discharge amount in the case that the supply amount of water supplied from the water pump 68 is 1 L/hr.

First, as shown in FIG. 8, in the tool holder 1 according to this embodiment, even when the rotational frequency increased from 0 to 1000, 3000 and 5000, the response time only increased from 5 seconds to 5 seconds, 7 seconds and 10 seconds, respectively. On the other hand, in the conventional tool holder 100, the response times at the respective rotational frequencies were 21 seconds, 29 seconds, 53 seconds and 102 seconds.

In this manner, in the conventional tool holder 100, the response time tends to be longer as the rotational frequency of the spindle 4 becomes higher. This is because, in the conventional tool holder 100, the mist generating device 90 which generates the water drop with oil film 110 is provided outside the tool holder 100, the route from the place where the water drop with oil film 110 is generated to the place where it is supplied to the work piece 113 is long, and since the centrifugal force becomes larger as the rotational frequency of the spindle 4 is higher, the time until the water drop with oil film 110 is discharged from the tool 6 becomes long.

On the other hand, in the tool holder 1 according to this embodiment, as shown in FIG. 2, the mist generating nozzle 40 and the top nozzle 50 are provided adjacent to the rear end portion of the tool 6, and the route from the place of generation of the water drop with oil film 110 to the place of supply of them to the work piece 113 is extremely short, the pressure difference by adiabatic expansion is promoted inside the atomizing space 41 by making the radial sectional area of the atomizing space 41 large with respect to the oil introducing passage 42 and the water introducing passage 43 to establish negative pressure, and the incident angles of the oil introducing passage 42 and the water introducing passage 43 with respect to the atomizing space 41 are formed to be an acute angle, whereby oil and water are regulated by the centrifugal force and negative pressure to be able to be stably supplied. Therefore, irrespective of the rotational frequency of the spindle 4, supply of oil and water becomes stable and the response time becomes short, thereby enabling the generated water drop with oil film 110 to reach the work piece 113 sufficiently in a short time.

Next, as shown in FIG. 9, the discharge amount in the tool holder 1 according to this embodiment hardly changes in such a way as to change from 0.95 L/hr to 0.90 L/hr, 0.92 L/hr and 0.90 L/hr as the rotational frequency of the spindle 4 changes from 0 to 1000, 3000 and 5000, while the discharge amount in the conventional tool holder 100 greatly changes from 0.72 L/hr to 0.64 L/hr, 0.55 L/hr and 0.21 L/hr as the rotational frequency of the spindle 4 changes from 0 to 1000, 3000 and 5000.

In the conventional tool holder 100, the discharge amount decreases as the rotational frequency of the spindle 4 becomes higher as described above. This is because, in the conventional tool holder 100, the route from the generation of the oil film attached water drops 110 to the supply of them to the work piece 113 is long as described above, and therefore the amount of the water drop with oil film 110 which attaches to a passageway of the route increases as the rotational frequency of the spindle 4 becomes higher, namely, loss in the process of transferring the water drop with oil film 110 increases, whereby the discharge amount of the water drop with oil film 110 to the work piece 113 decreases.

On the other hand, in the tool holder 1 according to this embodiment, the route from the place where the water drop with oil film 110 is generated to the place where they are supplied to the work piece 113 is extremely short, and since the radial sectional area of the atomizing space 41 is larger than the oil introducing passage 42 and the water introducing passage 43, the atomizing space 41 becomes under negative pressure due to adiabatic expansion, the loss in the process of transferring the water drop with oil film 110 is small irrespective of the rotational frequency of the spindle 4, and the discharge amount of the water drop with oil film 110 to the work piece 113 does not decrease.

As described above, in the tool holder 1 according to this embodiment, the radial sectional area of the atomizing space 41 is made larger than the oil introducing passage 42 and the water introducing passage 43, the atomizing space 41 is brought into negative pressure by adiabatic expansion, and the mist generating nozzle 40 and the top nozzle 50 are provided adjacent to the rear end portion of the tool 6. Therefore, responsiveness when supplying the water drop with oil film 110 to the work piece 113 can be enhanced.

Namely, since the process before the generated water drop with oil film 110 is supplied to the work piece 113 is short, and the atomizing space 41 is under the negative pressure, the time before they are supplied to the work piece 113 through the in-tool passage 7 of the tool 6 after the water drop with oil film 110 is generated after the time of turning on a power source can be made short.

In this embodiment, oil and water can be stably supplied to the atomizing space 41 by suppressing decrease of the effect of the above described negative pressure by decreasing the influence of the centrifugal force caused by rotation by forming the incident angles of the oil introducing passage 42 and the water introducing passage 43 to be an acute angle with respect to the atomizing space 41, and therefore, a sufficient amount of the water drops with oil film 110 can be supplied to the work piece 113 with less loss.

The invention claimed is:

1. A tool holder which is mounted on a machine tool for holding a tool for machining a work piece with a front or forward end portion of the tool, comprising:
   a tool mounting part connected to a spindle of the machine tool, the tool being mounted on the tool mounting part; and
   a support part fixed to a spindle supporting part of the machine tool, the support part supporting the tool mounting part via a bearing so that the tool mounting part is rotatable, wherein
   the tool mounting part contains in its inside: a mist generating nozzle formed in a cylindrical shape in which an atomizing space is formed in its center so as to be opened forward, and in which an oil introducing passage communicating with a rear side portion of the atomizing space and a water introducing passage communicating with a front side portion of the atomizing space are formed; and a top nozzle disposed at a front side portion of the mist generating nozzle to abut on a rear end portion of the tool so as to communicate with an in-tool passage formed inside the tool,
   an oil supply passage which supplies oil to the oil introducing passage by carrier gas consisting of compressed air, and a water supply passage which supplies water to the water introducing passage are formed in the support part, and
   when the oil supplied via the oil supply passage and the oil introducing passage reaches the atomizing space, the oil is atomized by an air flow of the carrier gas consisting of the compressed air, the water supplied from the water supply passage and the water introducing passage is formed into a water drop in the atomizing space by an air flow of oil containing compressed air containing said atomized oil so as to generate a water drop with oil film in which the oil film is formed on a surface of the water drop, and the water drop with oil film is supplied to the work piece through the top nozzle and the in-tool passage.

2. The tool holder according to claim 1 wherein incident angles of the oil introducing passage and the water introducing passage with respect to the atomizing space in the mist generating nozzle are formed to be an acute angle.

3. The tool holder according to claim 1, wherein the atomizing space in the mist generating nozzle is formed to pass through up to a rear end surface of the mist generating nozzle,
   an air introducing passage is formed in the tool mounting part to communicate with the atomizing space passing through up to the rear end surface, and
   the atomization of the oil and the generation of the water drop with oil film in the atomizing space are promoted by supplying compressed air to the air introducing passage.

4. The tool holder according to claim 2, wherein the atomizing space in the mist generating nozzle is formed to pass through up to a rear end surface of the mist generating nozzle,
   an air introducing passage is formed in the tool mounting part to communicate with the atomizing space passing through up to the rear end surface, and
   the atomization of the oil and the generation of the water drop with oil film in the atomizing space are promoted by supplying compressed air to the air introducing passage.

* * * * *